(12) United States Patent
Duan et al.

(10) Patent No.: US 10,766,371 B1
(45) Date of Patent: Sep. 8, 2020

(54) SYSTEM AND METHOD TO IMPROVE RANGE AND FUEL ECONOMY OF ELECTRIFIED VEHICLES USING LIFE BALANCING

(71) Applicant: FORD GLOBAL TECHNOLOGIES, LLC, Dearborn, MI (US)

(72) Inventors: Xiaohong Nina Duan, Canton, MI (US); Richard Dyche Anderson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/283,361

(22) Filed: Feb. 22, 2019

(51) Int. Cl.
*B60L 50/50* (2019.01)
*B60L 50/00* (2019.01)
*B60L 15/20* (2006.01)
*B60L 58/15* (2019.01)
*B60L 53/20* (2019.01)
*B60L 53/64* (2019.01)

(52) U.S. Cl.
CPC .......... *B60L 15/2045* (2013.01); *B60L 50/00* (2019.02); *B60L 50/50* (2019.02); *B60L 53/20* (2019.02); *B60L 53/64* (2019.02); *B60L 58/15* (2019.02); *B60L 2210/14* (2013.01); *B60L 2210/44* (2013.01); *B60L 2240/529* (2013.01)

(58) Field of Classification Search
CPC ................................. B60L 50/00; B60L 50/50
See application file for complete search history.

(56) References Cited

U.S. PATENT DOCUMENTS

| | | | |
|---|---|---|---|
| 5,625,272 A | 4/1997 | Takahashi | |
| 6,034,507 A | 3/2000 | Ikawa et al. | |
| 6,496,393 B1* | 12/2002 | Patwardhan | .......... H02M 7/003 |
| | | | 363/132 |
| 7,489,106 B1 | 2/2009 | Tikhonov | |
| 8,854,008 B2 | 10/2014 | Liu et al. | |
| 9,114,723 B2 | 8/2015 | Bissontz | |
| 9,570,999 B2 | 2/2017 | Yang et al. | |
| 9,825,474 B2 | 11/2017 | Tohara et al. | |
| 9,948,199 B2 | 4/2018 | McMorrow et al. | |
| 2002/0167291 A1 | 11/2002 | Imai et al. | |
| 2005/0122071 A1* | 6/2005 | King | ........................ B60L 9/00 |
| | | | 318/139 |

(Continued)

FOREIGN PATENT DOCUMENTS

DE 102013210293 A1 12/2014

OTHER PUBLICATIONS

Anderson, R. Dyche, et al. Life Balancing—A Better Way to Balance Large Batteries. No. 2017-01-1210. SAE Technical Paper, 2017.

(Continued)

*Primary Examiner* — Bentsu Ro
(74) *Attorney, Agent, or Firm* — David Kelley; Brooks Kushman, P.C.

(57) ABSTRACT

A vehicle includes a traction battery comprising a plurality of cells. The vehicle also includes a plurality of power converters each electrically coupled between a corresponding group of cells and an electrical bus. A controller is programmed to allocate current demand to the power converters and operate the power converters to minimize energy consumption and losses.

17 Claims, 5 Drawing Sheets

(56) References Cited

U.S. PATENT DOCUMENTS

| | | | |
|---|---|---|---|
| 2006/0016793 A1* | 1/2006 | Zhu | H01M 10/63 |
| | | | 219/205 |
| 2008/0061757 A1 | 3/2008 | Khayat et al. | |
| 2009/0033274 A1* | 2/2009 | Perisic | B60L 58/40 |
| | | | 318/771 |
| 2010/0102635 A1* | 4/2010 | Chen | H02J 7/1438 |
| | | | 307/75 |
| 2010/0117593 A1 | 5/2010 | Piccard et al. | |
| 2012/0001480 A1* | 1/2012 | Favaretto | H02J 7/0016 |
| | | | 307/9.1 |
| 2012/0105011 A1 | 5/2012 | Park | |
| 2013/0030581 A1 | 1/2013 | Luke et al. | |
| 2015/0214757 A1 | 7/2015 | Zane et al. | |
| 2016/0156191 A1 | 6/2016 | Takanaka | |
| 2016/0336765 A1 | 11/2016 | Trimboli et al. | |
| 2016/0336767 A1 | 11/2016 | Zane et al. | |
| 2017/0008415 A1 | 1/2017 | Ando et al. | |
| 2017/0077806 A1 | 3/2017 | Hong | |
| 2017/0297440 A1 | 10/2017 | Hu et al. | |
| 2017/0349059 A1* | 12/2017 | Xu | B60L 15/025 |
| 2018/0050597 A1 | 2/2018 | Hand, III et al. | |
| 2018/0050603 A1 | 2/2018 | Hand, III et al. | |
| 2018/0205341 A1* | 7/2018 | Syed | H02M 3/04 |
| 2019/0190386 A1 | 6/2019 | Cheng et al. | |
| 2019/0202300 A1* | 7/2019 | Pastor | H02J 7/04 |

OTHER PUBLICATIONS

Rehman, M. Muneeb Ur, et al. "Modular approach for continuous cell-level balancing to improve performance of large battery packs." 2014 IEEE Energy Conversion Congress and Exposition (ECCE). IEEE, 2014.

Wu, Hongwei, Manuela Sechilariu, and Fabrice Locment. "Influence of Dynamic Efficiency in the DC Microgrid Power Balance." Energies 10.10 (2017): 1563.

\* cited by examiner

SYSTEM AND METHOD TO IMPROVE RANGE AND FUEL ECONOMY OF ELECTRIFIED VEHICLES USING LIFE BALANCING

TECHNICAL FIELD

This application generally relates to a system for powering a low-voltage bus by one or more power converters arranged in parallel.

BACKGROUND

Electrified vehicles include hybrid-electric and electric vehicles and are configured to provide propulsion with a powertrain including an electric motor. Electrified vehicles distribute energy to various components that are connected to a high-voltage electrical bus and a low-voltage electrical bus. Sources of energy include a battery that is connected to the high-voltage bus and a generator that is also connected to the high-voltage bus. The vehicles generally include a single power converter for transferring energy from the high-voltage electrical bus to the low-voltage electrical bus. Fuel economy of electrified vehicles depends, at least in part, on an amount of energy drawn from the power grid during charging.

SUMMARY

A vehicle includes a traction battery comprised of cells and power converters, each electrically coupled between a corresponding group of cells and an electrical bus. The vehicle further includes a controller programmed to allocate current demand to the power converters and, responsive to currents allocated to a subset of the power converters having magnitudes less than a threshold, redistribute a sum of the currents to power converters not in the subset and operate the subset to provide no current.

The controller may be further programmed to initially allocate current demand to the power converters based on states of charge of the groups of cells such that a first power converter coupled to a first group of cells having a state of charge greater than a state of charge of a second group of cells coupled to a second power converter receives a greater current allocation. The current allocated to one or more of the power converters may be a negative current that flows to the cells. The threshold may be a current level corresponding to an efficiency being less than a predetermined converter efficiency. The controller may be further programmed to increase current magnitude of each of the power converters not in the subset by a factor that is a ratio of the current demand to a total current already allocated to each of the power converters not in the subset. The currents may include positive currents flowing from the cells and negative currents flowing to the cells, and the controller may be further programmed to redistribute a sum of the positive currents to power converters with positive current allocation and redistribute a sum of the negative current to power converter with negative current allocation. The controller may be further programmed to, responsive to currents allocated to all of the power converters having magnitudes less than the threshold, redistribute the current demand to a group of power converters such that current is supplied by a set of power converters such that each provides current that exceeds the threshold. The controller may be further programmed to redistribute the current such that a total current provided by the power converters is the same before and after redistribution of the currents.

A method includes operating, by a controller, power converters electrically coupled between corresponding groups of battery cells and an electrical bus to satisfy a current demand of the electrical bus by allocating a portion of the current demand to each of the power converters and, responsive to a subset of the power converters being allocated currents having magnitudes less than a threshold, redistribute a sum of the currents to power converters not in the subset and operate the subset to provide no current. The method may further include allocating the current demand based on a state of charge of the corresponding groups of battery cells. The method may further include redistributing current by increasing current to each of the power converters not in the subset by a factor that is a ratio of the current demand to a total current already allocated to each of the power converters not in the subset. The method may further include, responsive to all of the power converters being allocated currents having magnitudes less than the threshold, redistribute the current demand to a group of power converters such that each provides current that exceeds the threshold. The method may further include redistributing the sum of the currents such that a total current provided by the power converters is the same before and after redistribution of the currents. The currents may include positive currents and negative currents and the method may further include redistributing a sum of the positive currents to power converters with positive current allocation and redistributing a sum of the negative current to power converter with negative current allocation. The threshold may be a current level corresponding to an efficiency being less than a predetermined converter efficiency.

A vehicle electrical system includes a plurality of power converters each electrically coupled between a group of battery cells and an electrical bus. The vehicle electrical system further includes a controller programmed to allocate current demand to the power converters and, responsive to currents allocated to a subset of the power converters having magnitudes less than a threshold, redistribute a sum of the currents to power converters not in the subset such that a total current provided by the power converters is the same before and after redistribution of the currents and operate the subset to provide no current.

The controller may be further programmed to increase current magnitudes to each of the power converters not in the subset by a factor that is a ratio of the current demand to a total current already allocated to each of the power converters not in the subset. The currents may include positive currents and negative currents, and the controller may be further programmed to redistribute a sum of the positive currents to power converters with positive current allocation and redistribute a sum of the negative current to power converter with negative current allocation. The controller may be further programmed to, responsive to currents allocated to all of the power converters having magnitudes less than the threshold, redistribute the current demand to a group of the power converters such that current is supplied by a set of power converters that each provide current that exceeds the threshold. The threshold may be a current level corresponding to an efficiency being less than a predetermined converter efficiency.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
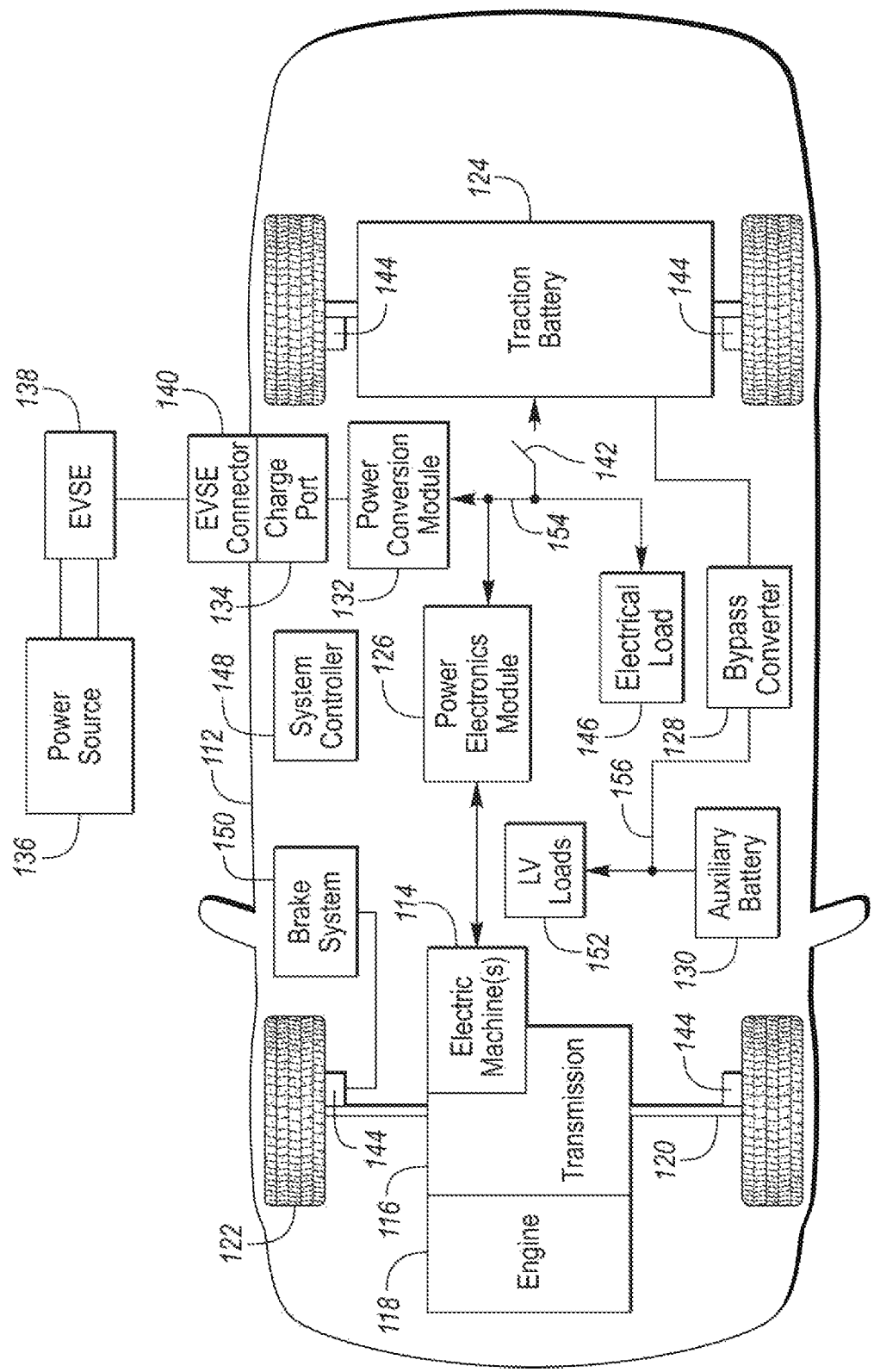
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present.

A traction battery or battery pack 124 stores energy that can be used by the electric machines 114. The traction battery 124 may be electrically couplable to a high-voltage electrical bus 154. The high-voltage bus 154 may include power and return conductors. The vehicle battery pack 124 may provide a high voltage direct current (DC) output. One or more contactors 142 may isolate the traction battery 124 from the high-voltage bus 154 when opened and connect the traction battery 124 to the high-voltage bus 154 when closed. The traction battery 124 may be electrically coupled to one or more power electronics modules 126 (may also be referred to as a traction inverter). The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a bypass converter module 128 that converts the high voltage DC output of the traction battery 124 to a low voltage DC supply that is compatible with low-voltage vehicle loads 152. The bypass converter module 128 may be coupled between the high-voltage bus 154 and a low-voltage electrical bus 156. An output of the bypass converter module 128 may be electrically coupled to the low-voltage electrical bus 156 and to an auxiliary battery 130 (e.g., 12V battery) for charging the auxiliary battery 130. The low-voltage systems and loads 152 may be electrically coupled to the low-voltage electrical bus 156. The low-voltage bus 156 may include power and return conductors. One or more electrical loads 146 may be coupled to the high-voltage bus 154. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132.

The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic module that is present in the vehicle 112. A vehicle system controller (VSC) 148 may be present to coordinate the operation of the various components.

Electrified vehicles (e.g., BEV, PHEV) distribute power via the high-voltage bus 154 and the low-voltage bus 156. Prior arrangements typically utilize a single DC/DC converter electrically coupled between the high-voltage bus 154 and the low-voltage bus 156 to provide power to the low-voltage bus 156. The DC/DC converter may be configured to reduce the voltage of the high-voltage bus 154 to a voltage level (e.g., 12V) of the low-voltage bus 156. The system described herein replaces the traditional DC/DC converter with the bypass converter module 128 to provide power to the low-voltage bus 156 and provide additional benefits to be described herein.

Vehicle performance for conventional internal combustion engine (ICE) vehicles may be evaluated in terms of fuel economy. However, electrified vehicles may be evaluated in term of energy economy. Analysis of the energy economy for electrified vehicles may consider the total amount of energy provided during charging. Since electrical energy may be used for propulsion, an energy economy term similar to fuel economy may be computed using equivalent representations for the electrical energy. Energy economy may be represented as a travel range or distance provided by the traction battery 124. Electrical energy may be provided to the high-voltage electrical bus 154 and the low-voltage electrical bus 156. During operation, energy provided by the traction battery 124 is used for propulsion and for low-voltage loads 152. The low-voltage loads 152 may be similar to those in conventional vehicles. In the electrified vehicle 112, the bypass converter 128 may perform functions similar to the alternator of the conventional vehicle.

Fuel and/or energy economy of electrified vehicles may be affected by efficiency of the bypass converter 128. The efficiency of a power converter may vary with the amount of current or power passing through the converter. The power output by the bypass converter 128 may be defined as the product of the voltage at the converter output and the current provided by the converter. The current passing through the bypass converter 128 may be determined by the current drawn by the low-voltage loads 152 coupled to the low-voltage electrical bus 156. The bypass converter 128 may be configured to satisfy the maximum current requirement of the low-voltage electrical bus 156. The current demand of the low-voltage electrical bus 156 may vary significantly based on operating conditions of the vehicle 112. For example, during a drive cycle, the current demand may be hundreds of Amperes. During battery charging or idle conditions, the current demand may ten Amperes or less. The bypass converter 128 may operate over a large current range. A conventional power converter designed to be highly efficient at high current levels may be significantly less efficient at lower current levels.

The efficiency of a power converter may be affected by the conversion ratio. The conversion ratio may be expressed as the ratio of the input voltage to the output voltage of the power converter. For example, in some electrified vehicle configurations, the input voltage may be 300 Volts and the output voltage may be 12 Volts. Efficiency improvements may be realized by decreasing the conversion ratio. Energy economy and/or efficiency may also be affected by energy that is wasted or lost (e.g., as heat) in the system.

Some solutions to improve energy economy may incorporate a second power converter that is optimized for high efficiency at lower current levels. However, such solutions can add additional cost and complexity to the system. Further, additional control logic is needed to manage switching between the converters.

Figure 2:
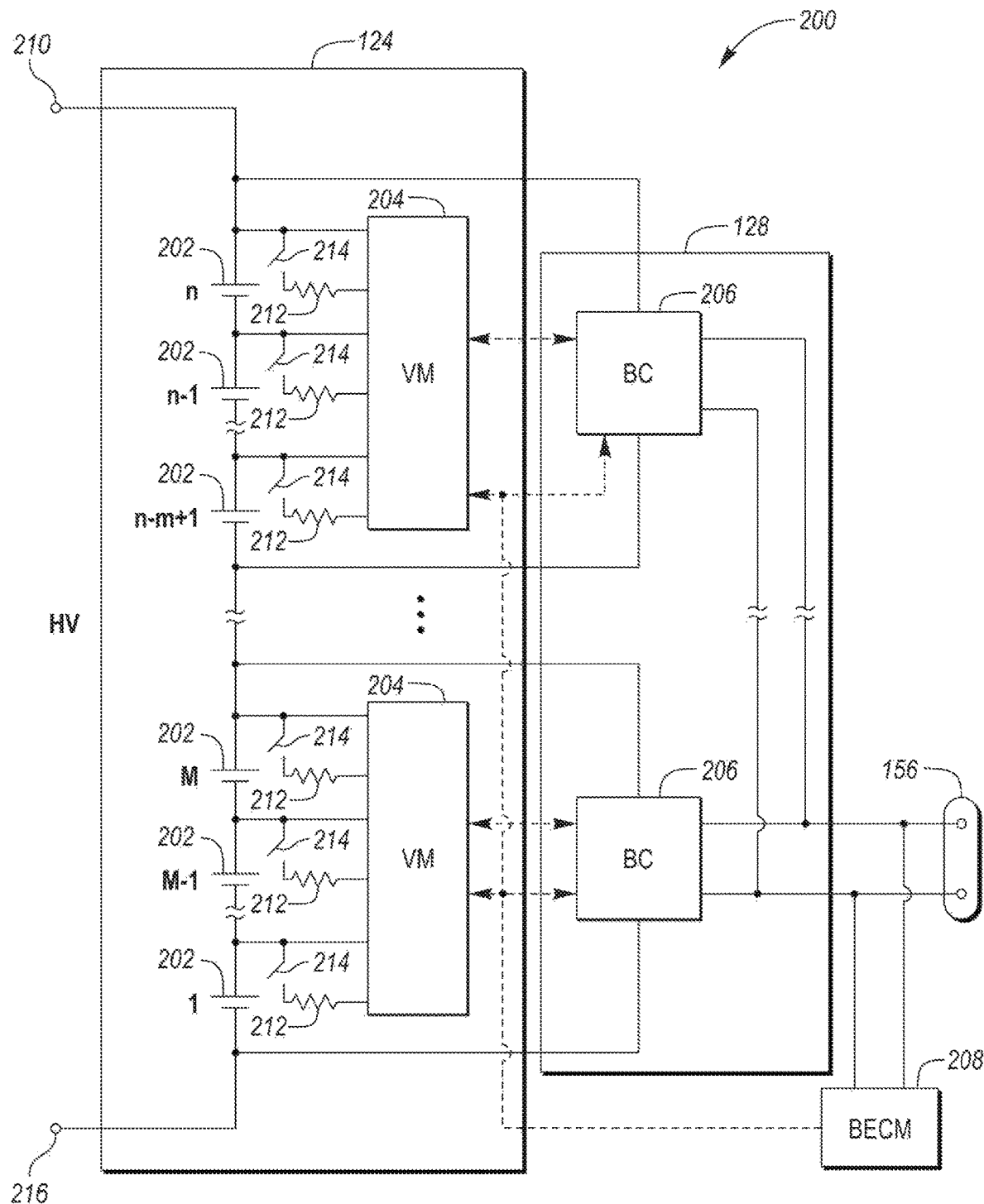
FIG. 2 is a diagram of a vehicle electrical system including bypass converters.

FIG. 2 depicts a possible configuration of a vehicle electrical system 200. The traction battery 124 may be coupled to the high-voltage electrical bus 156 through a positive terminal 210 and a negative or return terminal 216. The traction battery 124 may be comprised of a plurality of battery cells 202. The battery cells 202 may be constructed from a variety of chemical formulations. Typical battery pack chemistries may be lead acid, nickel-metal hydride (NIMH) or Lithium-Ion. The traction battery 124 may be comprised of a series configuration of n battery cells 202. Other configurations are possible, however, and the traction battery 124 may be composed of any number of individual battery cells 202 connected in series or parallel or some combination thereof. The system may include one or more controllers, such as a Battery Energy Control Module (BECM) 208, that are configured to monitor and control the performance of the traction battery 124. The BECM 208 may monitor several traction battery characteristics such as pack current, pack voltage and pack temperature. The BECM 208 may include non-volatile memory such that data may be retained when the BECM 208 is in an off condition. Retained data may be available upon the next key cycle.

In addition to the pack level characteristics, there may be battery cell level characteristics that are measured and monitored. For example, the terminal voltage, current, and temperature of each of the battery cells 202 may be measured. The vehicle electrical system 200 may use one or more sensor modules 204 to measure the characteristics of the battery cells 202. The sensor modules 204 may include voltage sensors configured to measure the voltage across each of the battery cells 202. Depending on the capabilities, the sensor modules 204 may measure the characteristics of one and/or groups of the battery cells 202. The traction battery 124 may utilize multiple sensor modules 204 to measure the characteristics of all the battery cells 202. Each sensor module 204 may transfer the measurements to the BECM 208 for further processing and coordination. The sensor modules 204 may transfer signals in analog or digital form to the BECM 208. In some configurations, the sensor module 204 functionality may be incorporated internally to the BECM 208. That is, the sensor module 204 hardware may be integrated as part of the circuitry in the BECM 208 and the BECM 208 may handle the processing of raw signals.

The BECM 208 may be configured to compute various characteristics of the traction battery 124 and/or battery cells 202. Quantities such a battery power capability and battery state of charge may be useful for controlling the operation of the traction battery 124 as well as any electrical loads 146 receiving power from the traction battery 124. Battery power capability is a measure of the maximum amount of power the traction battery 124 can provide or the maximum amount of power that the traction battery 124 can receive. Each of the battery cells 202 may be characterized by a battery power capability. Knowing the battery power capability allows electrical loads 146 to be managed such that the power requested is within limits that the traction battery 124 can handle.

Battery state of charge (SOC) gives an indication of how much charge remains in the battery. The battery SOC may be output to inform the driver of how much charge remains in the traction battery 124, similar to a fuel gauge. The battery SOC may also be used to control the operation of an electrified vehicle. Calculation of battery SOC can be accomplished by a variety of methods. One possible method of calculating battery SOC is to perform an integration of the battery pack current over time. This is well-known in the art as ampere-hour integration. The SOC of each of the battery cells 202 may be computed in a similar manner.

Another feature of the traction battery 124 may be the ability to balance the battery cells 202. The traction battery 124 may include hardware and software features to perform balancing of the battery cells 202. Balancing the battery cells 202 may include charging or discharging individual battery cells 202 so that the states of charge or power capability of the battery cells 202 are equalized. This operation is useful to prevent overcharging and/or undercharging of individual battery cells. To facilitate cell balancing, the traction battery 124 and/or sensor modules 204 may include a switching element 214 and a resistor 212 coupled to each of the battery cells 202. The switching element 214 and the resistor 212 may be arranged so that the resistor 212 may be coupled in parallel with a battery cell 202 to cause current to flow from the battery cell 202 through the resistor 212. By activating the switching element 214, current may flow from the battery cell 202 through the resistor 212 to cause the cell SOC to decrease. The switching element 214 may be controllable by the sensor module 204 via a control signal. The switching element 214 may be in a normally open position. The switching element 214 may be a solid-state element (e.g., metal-oxide semiconductor field-effect transistor (MOSFET)). The cell balancing achieved by the resistor may be referred to as passive cell balancing as it only affects a discharge of the battery cells. Passive cell balancing may contribute to wasted energy since the energy is lost as heat in the resistor 212.

The BECM 208 may be programmed to manage life balancing of the traction battery 124. Life balancing may include active and passive balancing procedures. Various methods for managing cell balance may be available. For example, cell balancing may be performed after a charging event. The SOC of each of the battery cells 202 may be compared. Battery cells 202 having a higher SOC may be discharged to match the SOC of the remaining cells by activating the associated switching element 214 to discharge current from the cell. Life balancing allows cell balancing by operating cells or groups of cells during drive cycles. Life balancing may achieve balance between groups of cells 202 while passive cell balancing may achieve balance between individual cells by discharging current through the resistor 212. Other criteria for managing cell balance may be used. For example, the life balancing may be configured to balance the cells 202 to maximize range, life, and/or available power during a drive cycle. Each strategy may result in a different balancing strategy.

The bypass converter module 128 may include a plurality of DC/DC bypass converters 206 that are configured to provide an output voltage compatible with the low-voltage bus 156. The voltage outputs of the bypass converters 206 may be connected in parallel such that each of the bypass converters 206 may contribute to the current flowing through the low-voltage bus 156. The voltage input to each of the bypass converters 206 may be coupled across a predetermined number of battery cells 202. For example, the input to the bypass converters 206 may be across m battery cells 202. The m battery cells may be referred to as a group of battery cells. The voltage input to the bypass converters 206 may be the sum of the voltages across the m battery cells 202. The voltage input may also be referred to as the voltage across the group of battery cells. In addition, each group of battery cells may have an associated SOC that may be derived from the individual battery cells that make up the group. For example, the group SOC may be an average cell SOC, a median cell SOC, a lowest cell SOC of the battery cells in the group, or a highest SOC of the battery cells of the group.

Depending on the voltage input, the bypass converters 206 may be configured to increase (boost) or decrease (buck) the voltage to provide the output voltage. In some configurations, the bypass converters 206 may include a bypass mode to couple the input to the output with a high efficiency when the input and output voltage levels are similar. For example, the bypass mode may increase efficiency by avoiding switching losses within the converter. The bypass converters 206 may include an internal controller to manage the voltage conversion operation. As there are multiple bypass converters 206, the BECM 208 may manage and coordinate the operation of the bypass converters 206 to supply a total current provided to the low-voltage bus 156. For example, each of the bypass converters 206 may communicate with the BECM 208 over the vehicle network or a dedicated communication channel.

Each of the bypass converters 206 may be operated to provide current to the low-voltage bus 156. Current demand on the low-voltage bus 156 may be satisfied by operation of the bypass converters 206. As there are multiple bypass converters 206 the current may be distributed or proportioned among each of the bypass converters 206. There may be a predetermined number of converters with each assigned an integer index in the range of 1 to max. The BECM 208 may manage the total current provided to the low-voltage bus 156 by the bypass converters 206. The BECM 208 may be programmed to distribute a portion of the total current to each of the bypass converters 206. The BECM 208 may implement a current distribution function. The current distribution function may distribute the total current to the individual bypass converters 206 based on the state of charge of the battery cells 202 (cell unit) associated with each of the bypass converters 206.

The bypass converters 206 may be in communication with an associated sensor module 204. For example, the bypass converters 206 and the sensor modules 204 may be connected to a serial peripheral interface (SPI) bus. The SPI bus may be a dedicated communication link between the bypass converter 206 and associated sensor module 204. Voltage and current values from the corresponding group of battery cells 202 may be transferred from the sensor module 204 to the bypass converters 206.

The BECM 208 may be in communication with the sensor modules 204 and the bypass converters 206. For example, the BECM 208 and the sensor modules 204 may communicate via a CAN communication channel. In some configurations, the communication between the BECM 208 and the bypass converters 206 may be indirect and pass through the sensor modules 204. For example, the BECM 208 may communicate via the CAN communication channel to the sensor modules 204. The sensor modules 204 may then transfer messages for the bypass converters 206 to the SPI bus.

The bypass converters 206 may include one or more current sensors to measure the input and/or output current of the bypass converter 206. The current measurement may be used for control of the conversion operation. In addition, the current measurement values may be communicated to the BECM 208. The bypass converters 206 or associated sensor modules 204 may include one or more voltage sensors to measure the input and/or output voltage of the bypass converter 206. In some configurations, the output voltage may be measured by the BECM 208 and the output voltage value may be communicated to the bypass converters 206. In some configurations, the sensor module 204 may measure or calculate the voltage across the group of battery cells 202 and communicate the value to the bypass converters 206 as the input voltage.

The total current supplied from traction battery 124 to the low-voltage bus 156 may be varied with the current demanded by the LV loads 152 to regulate the LV bus voltage to a target voltage. The current demand on the low-voltage bus 156 may vary from a few Amperes to over hundreds of Amperes in an electrified vehicle. As such, the total current draw of the bypass converter 128 varies in same range. The vehicle electrical system with a plurality of DC/DC bypass converters 206 is not only able to individually adjust the current flow through each of the bypass converters 206 but can also reduce the voltage conversion ratio between the bypass converter input and output. The ratio may be made close to one in order for the converters to work with higher converting efficiency (e.g., engaging a bypass mode of the converter). As shown in FIG. 2, the input voltage of bypass converters 206 may be determined by a predetermined number of battery cells 202, and the output voltage of converters may be determined by LV bus voltage which is nominally around 12V for a vehicle. Considering the effect of the voltage converting ratio on the converter efficiency, the ratio may be selected to be in the range of 1-2. For this ratio range, there may be 3 to 6 battery cells 202 that are serially connected on the battery or input side of the bypass converters 206.

The BECM 208 may be programmed to implement a strategy for allocating or proportioning the current among the bypass converters 206. When the current demand of the low-voltage electrical bus 156 is high, the current may be proportioned equally between the bypass converters 206. Each of the bypass converters 206 may operate with a current greater than a current threshold resulting in operation above a selected limit of efficiency.

Figure 4:
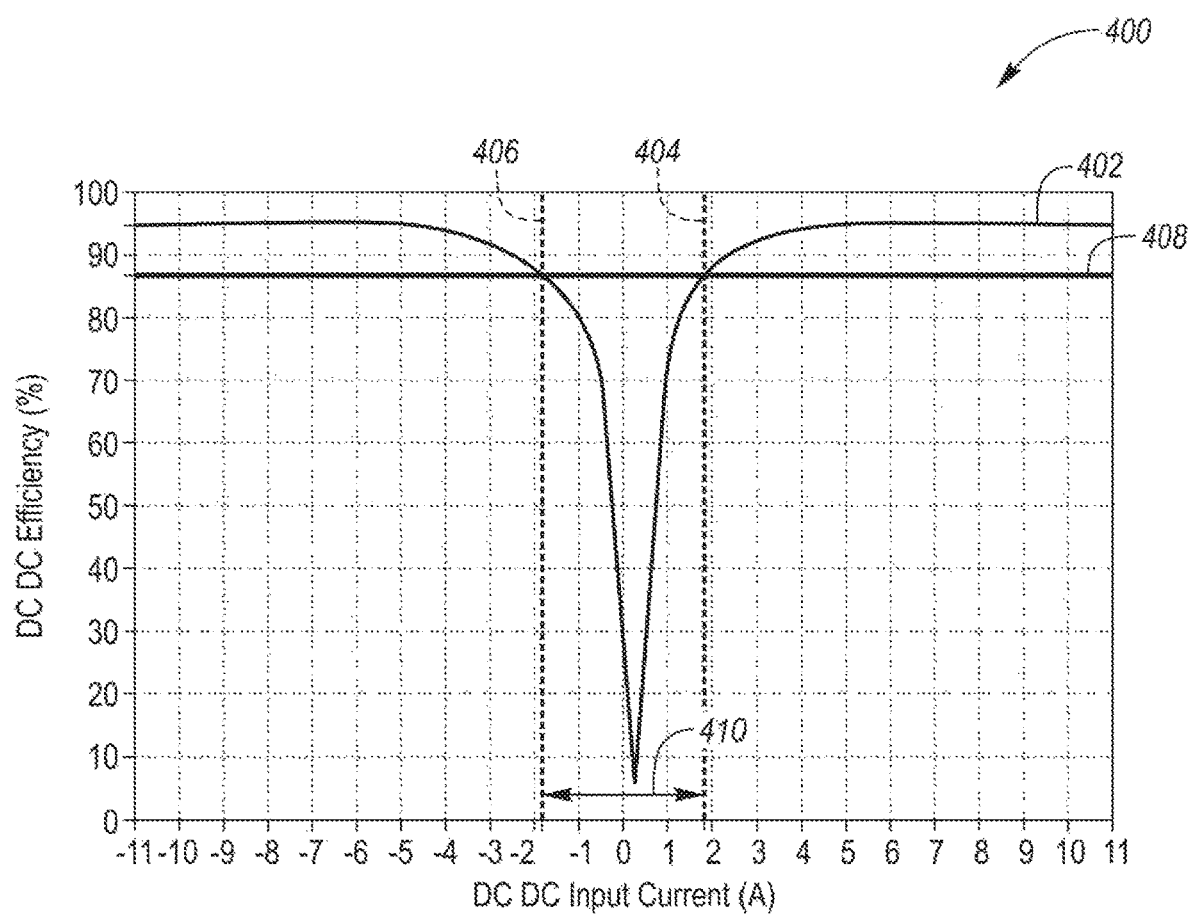
FIG. 4 is a graph of a possible converter efficiency curve with respect to converter input current.

A factor that affects converter efficiency may be the current flow through the bypass converter 206 after the ranges of input and output voltages are determined. As an example, a graph 400 of a possible efficiency curve 402 of a bypass converter 206 is shown in FIG. 4. At current magnitudes above a certain threshold the efficiency generally exceeds 85%. The converter efficiency decreases when the input current magnitude falls within a window defined within a certain current boundary, and approaches zero as the input current magnitude approaches to zero. When viewed from an efficiency standpoint, it is desired to operate the bypass converters 206 at higher current levels (e.g., >2 A) to achieve efficiencies greater than a predetermined efficiency level 408. The converter efficiency may also be expressed as a function of power provided by the bypass converter 206. For example, the current axis of FIG. 4 may also be expressed as a power axis. A power threshold may be defined at which the efficiency exceeds a predetermined efficiency (e.g., 85%). In the following discussion, current or power may be used for selecting the bypass converters 206 and associated operating points.

When a plurality of DC/DC bypass converters 206 is used to supply power from traction battery 124 to the low-voltage bus 156 of an electrified vehicle, the number of bypass converters 206 that are used may be determined by the maximum allowed current of the bypass converters 206 and the number of battery cells 202 that are connected to the bypass converters 206 after considering the voltage conversion ratio and balance requirements. For example, if the nominal voltage of the high-voltage bus 154 is about 300V, the system may need 13-26 converters when the voltage conversion ratio is in a range of 1-2. One mode of operation may be to distribute the current load equally among the DC/DC bypass converters 206. As an example, a system may include fourteen bypass converters having a conversion ratio of 2 (e.g., input/output is 2) and the converters may be operated such that each of the converters provide the same level of current. In this example, the average input current of a bypass converter may be in the range between less than 0.5 A to greater than 7 A when current loads of the low-voltage bus 156 that are connected to the output of the bypass converters varies in the range of 10 A to 200 A. When distributing the current equally, the converter efficiency may be below 75% when the low-voltage bus 156 current load is less than about 30 A. The efficiency may fall below 50% if the low-voltage bus 156 current load is less than about 15 A. Lower working efficiency of the converters not only affects equivalent fuel economics of vehicle, but also results in higher heat generation.

The total current supplied from the high-voltage electrical bus 154 to the low-voltage electrical bus 156 may vary based on the current demand of the low-voltage loads 152. The current flow through each of the DC/DC bypass converters 206 may be individually adjusted according to the corresponding cell unit state. The cell unit state may include a cell voltage, a voltage across a group of cells 202, a battery cell capacity, a capacity of a group of battery cells, a cell state of charge, and/or a state of charge of a group of cells 202. Current flow through some of the bypass converters 206 may be low (e.g., <1 Amp) even though the total current supplied to the low-voltage electrical bus 156 and/or the average converter current may be much higher. The current distribution may be determined by the balance state of the associated battery cells 202. The SOC of the battery cells or groups of battery cells may be considered when selecting the bypass converter current levels. The SOC differences between the groups of battery cells may be used to adjust a proportion of current distributed to each of the bypass converters 206. Considering the SOC differences may decrease divergence of the battery SOC from a reference SOC. The strategy may provide active balancing of the battery cells without intentional losses from dissipating energy in passive resistors.

Using the battery cell unit state may result in each of the bypass converters 206 passing a different amount of current. To achieve cell balance during battery discharging, cell groups having a higher state of charge may have a larger current flow than cell groups with lower states of charge. In this situation, the current flow for some of the bypass converters 206 may cause the associated converters to operate in a range of lower efficiency. Current demand may be allocated to the bypass converters 206 based on states of charge of the groups of battery cells 202 such that a first bypass converter coupled to a first group of battery cells having a state of charge greater than a state of charge of a second group of battery cells coupled to a second bypass converter receives a greater current allocation.

The relationship between the converter efficiency and the converter input current may be known for the bypass converters 206 as shown in FIG. 4. From this relationship, the minimum magnitude of the input current to achieve an efficiency above a predetermined efficiency value 408 can be determined. The predetermined efficiency value 408 may be based on vehicle performance requirements. The predetermined efficiency value 408 may be selected as a minimum operating efficiency for the bypass converters 206. When the limit of efficiency is selected, the current and/or power limits may be determined.

A minimum accepted efficiency limit for the bypass converters 206 may be selected as the predetermined efficiency level 408. The predetermined efficiency level 408 may be a calibratable value based on system design requirements. Corresponding to the predetermined efficiency level 408, a zero-current range 410 may be defined by a high limit zero-current bound 404 and a low limit zero-current bound 406. If current is allocated to one of the bypass converters 206 in the zero-current range 410 of current between a high limit zero-current bound 404 and a low limit zero-current bound 406, then the current may be restricted to zero. Outside of the zero-current range 410, the current may be allowed to be passed. When power is used, a zero-power range may be defined with corresponding high limit zero-power bound and low limit zero-power bound.

Figure 3:
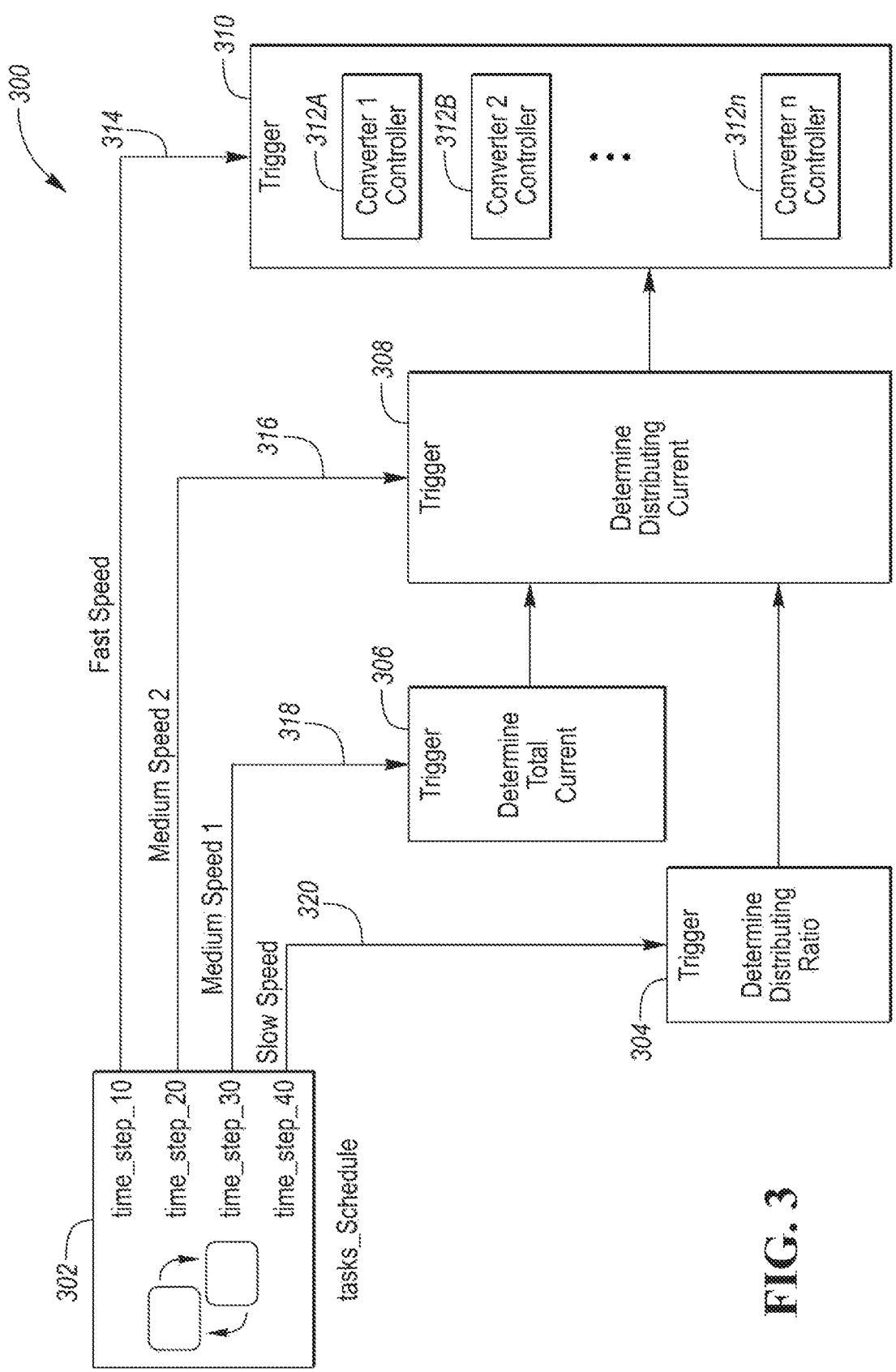
FIG. 3 is a block diagram of a possible configuration for operating the bypass converters.

FIG. 3 depicts a block diagram 300 for processes for managing and operating the bypass converters 206. A timing process 302 may generate signals for triggering the other processes. The timing process 302 may be interrupt driven or polled. The timing process 302 may generate a plurality of trigger signals for triggering execution of processes. The timing process 302 may generate trigger signals at different rates. The timing process 302 may generate a fast-speed trigger 314 that is configured to trigger execution of high-speed processes. The high-speed processes may be those processes that are to be executed most frequently. The timing process 302 may generate a slow-speed trigger 320 that is configured to trigger execution of low-speed processes. The low-speed processes may be those processes that are to be executed least frequently. The timing process 302 may generate a first medium-speed trigger 318 and a second medium-speed trigger 316 that are configured to trigger execution of medium-speed processes. The first medium-speed trigger 318 and the second medium-speed trigger 316 may occur at rates between the low-speed trigger 320 and the high-speed trigger 314.

The trigger signals may cause execution of different processes. For example, high-speed processes may include low-level control routines. Low-speed processes may include high-level or background operations such as setting overall parameters. Medium-speed processes may include intermediate control decisions that set reference or setpoint values for the low-level control routines.

A target current distribution process 304 may be configured to determine a current distribution ratio for each of the bypass converters 206. The target current distribution process 304 may be triggered by the slow-speed trigger 320. For example, the target current distribution process 304 may determine the current allocation to each of the bypass converters 206 based on the states of charge of associated battery cell groups.

A total current demand process 306 may be configured to determine the total current demand for the low-voltage electrical bus 156. The total current demand process 306 may receive information from low-voltage loads 152. The total current demand process 306 may receive a voltage of the low-voltage electrical bus 156. The total current demand process 306 may be triggered by the first medium-speed trigger 318. For example, the total current demand process 306 may include a closed-loop control strategy based on a reference voltage and the actual voltage of the low-voltage electrical bus 156.

A current distribution process 308 may be configured to generate the current distribution for the bypass converters 206. The current distribution process 308 may receive the total current demand from the total current demand process 306 and distribution ratios from the target current distribution process 304. The current distribution process 308 may be triggered by the second medium-speed trigger 316. The current distribution process 308 may adjust the current allocation to improve overall efficiency of the vehicle electrical system.

The current distribution process 308 may accumulate the currents that are restricted or limited. The restricted currents may be identified as positive or negative. A positive current may be defined as a current flow from the traction battery cells 202 to the low-voltage electrical bus 156. A negative current may be defined as a current flow from the low-voltage electrical bus 156 to the traction battery cells 202. Positive and negative currents may be separately accumulated. For example, a first variable may be used to accumulate negative currents and a second variable may be used to accumulate positive currents. The accumulated currents may be redistributed to the bypass converters 206 that are not being limited or restricted. Bypass converters that are not limited may have an initial target current allocation that is outside of the zero-current range 410 (e.g., greater than the high limit zero-current bound 404 or less than the low limit zero-current bound 406). The accumulated positive currents may be redistributed to the bypass converters having current that is greater than the high limit zero-current bound 404. The accumulated negative currents may be distributed to the bypass converters having current that is less than the low limit zero-current bound 406.

A bypass converter management process 310 may be configured to operate the bypass converters 206 to achieve the selected target current. The bypass converter management process 310 may be triggered by the fast-speed trigger 314. The bypass converter management process 310 may include a converter control process 312 for each of the bypass converters 206. The bypass converter management process 310 may receive a target current for each of the bypass converters 206. The converter control process 312 may receive the target current and operate the bypass converter to achieve the target current.

Figure 5:
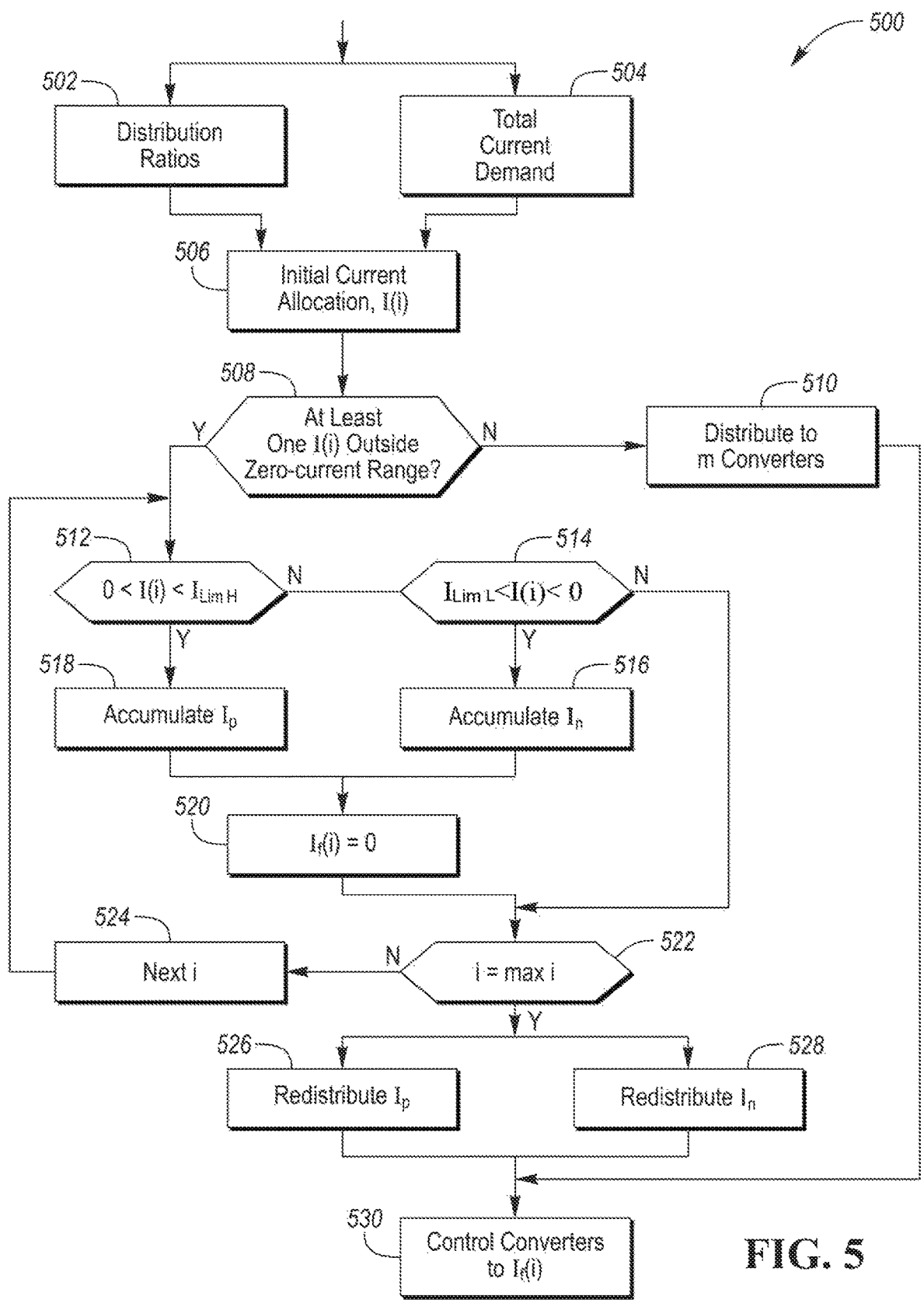
FIG. 5 is a flowchart for a possible sequence of operations for operating the bypass converters to satisfy current demand on an electrical bus.

FIG. 5 depicts a flow chart 500 for a possible sequence of operations for allocating current to the bypass converters 206. At operation 502, the distribution ratios may be determined. Operation 502 may be implemented as part of the target current distribution process 304. For example, the distribution ratios may be determined based on the state of charge of the cell groups associated with the bypass converters 206 as previously described herein. The distribution ratios may be selected to cause the battery cells 202 to move toward a balance condition such that all of the battery cells 202 have the same SOC after a predetermined time. The active balancing strategy may achieve balance between the groups of battery cells 202 that are coupled to corresponding bypass converters 206. Passive balancing using the resistor 212 may be used to achieve balance between battery cells 202 with each of the groups. The active balancing strategy may reduce the current discharged in the resistors 212 during passive balancing.

At operation 504, the total current or power demand may be determined. Operation 504 may be implemented as part of the total current demand process 306. A closed-loop voltage control strategy may be implemented in which the total current demand is based on an error between the bus voltage and a reference voltage. Operation 502 and operation 504 may be performed in parallel or sequentially.

At operation 506, an initial current allocation may be determined. A target current, I(i), for each of the bypass converters 206 may be computed as a product of the total current demand and the corresponding distribution ratios. The result may be an initial estimate of the target current for each of the bypass converters 206. The allocation may also be a power allocation. However, further processing may be performed to account for converter efficiencies.

It may be desired to operate the bypass converters with a low initial current allocation at zero current and reallocate the current to the other bypass converters 206. The initial target current allocations may each be compared to the zero-current range 410. If the initial target current allocation falls within the zero-current range 410, the current allocated to the corresponding bypass converter may be limited to zero.

At operation 508, the target currents may be compared to the high limit zero-current bound 404 and a low limit zero-current bound 406 to determine if the target current falls within the zero-current range 410. If none of the target currents fall outside of the zero-current range 410, operation 510 may be performed. For example, the initial current distribution may result in all of the target currents falling within the zero-current range 410. Under this condition, the bypass converters 206 could potentially operate at lower efficiency levels unless the target currents are distributed in a different manner.

At operation 510, the target current may be distributed to a subset of the bypass converters 206. Operation of the bypass converters 206 when all currents are within the zero-current range 410 would result in poor efficiency. In this condition, the current demand may be redistributed such that a group of the total number of bypass converters 206 is operated above the predetermined efficiency value 408. Some of the bypass converters 206 may be operated at zero current. In this condition, the total current demand may be distributed to a group of m bypass converters such that each of the m bypass converters are operating at or above the predetermined efficiency value 408. The m bypass converters may be selected according the battery cell unit parameters. For example, the number m may be estimated as the total current divided by the high limit zero-current bound 404.

Operation 510 may also be performed when the total current demand falls within the zero-current range 410. Under this condition, the distributed current for all of the bypass converters 206 may be set to zero. In this case, the total current before and after the current redistribution may differ. In some configurations, one of the bypass converters 206 operating below the predetermined efficiency value 408 may be operated to supply the current demand. Operating in this manner, the total current before and after distribution may be the same. This mode of operation results in lower efficiency.

If at least one of the initial target currents is outside of the zero-current range 410, operation 512 may be performed. Each of the initial current allocations may be compared to the zero-current range 410. Current estimates that fall between the low-limit zero-current bound 406 and the high-limit zero-current bound 404 represent converter operation at low efficiency levels. At operation 512, the initial current allocation may be checked to determine if the value is between zero and the high limit zero-current bound 404 ($I_{LimH}$). This indicates a small positive current (e.g., flowing to the low-voltage electrical bus 156). If the condition is satisfied, operation 518 may be performed. At operation 518, the corresponding initial current allocation may be accumulated or summed in a first variable ($I_p$). At operation 520, the corresponding final current allocation, $I_f(i)$, is set to zero.

If the condition is not satisfied, operation 514 may be performed. At operation 514, the initial current allocation may be checked to determine if the value is between zero and the low limit zero-current bound 406 ($I_{LimL}$). This indicates a small negative current (e.g., flowing from the low-voltage electrical bus 156). If the condition is satisfied, operation 516 may be performed. At operation 516, the corresponding initial current allocation is accumulated or summed in a second variable ($I_n$). At operation 520, the final current allocation, $I_f(i)$, is set to zero.

At operation 522, the index, i, may be compared to the maximum index (e.g., the total number of converters). The index being equal to the maximum index may be indicative of all of the current allocations being processed. If the index is less than the maximum index, operation 524 may be performed. At operation 524, the index, i, may be incremented and operations starting at 512 may be performed for the next current allocation. If the initial current allocations have all been processed, operation 526 and operation 528 may be performed.

The previous operations determine a subset of the power converters that includes zero-limited bypass converters that have a magnitude (e.g., current or power) less than a threshold (e.g., the low-limit zero-current bound 406 and the high-limit zero-current bound 404). The total current allocated to the subset may be redistributed to the bypass converters that are not part of the subset (e.g., having current allocation outside of the zero-current range 410). Bypass converters that are members of the subset are operated to provide no current.

At operation 526, positive currents may be redistributed to bypass converters that are not in the subset that includes the zero-limited bypass converters. The positive current may be redistributed to those bypass converters having a positive current allocation. One strategy for redistributing the positive currents that are accumulated in the first variable ($I_p$) may be to equally distribute the accumulated current to those converters having a positive current allocation. The current may also be redistributed as follows:

$$I_f(i)=I(i)*I_{ptotal}/(I_{ptotal}-I_p)$$

where $I_{ptotal}$ is an accumulation of all the positive initial current allocations, and I(i) is the initial current allocation. The current allocation to each of the bypass converters may be increased by a factor that is a ratio of the total current demand (represented by $I_{ptotal}$) to a total current already allocated (represented by $I_{ptotal}-I_p$) to each of the bypass converters having current above the threshold.

At operation 528, negative currents may be redistributed. The negative current may be redistributed to those converters having a negative current allocation. One strategy for redistributing the negative currents that are accumulated in the second variable ($I_n$) may be to equally distribute the accumulated current to those converters having a negative current allocation. The current may be redistributed as follows:

$$I_f(i)=I(i)*I_{ntotal}/(I_{ntotal}-I_n)$$

where $I_{ntotal}$ is an accumulation of all the negative initial current allocations, and I(i) is the initial current allocation. The current allocation to each of the bypass converters may be increased by a factor that is a ratio of the total current demand (represented by $I_{ntotal}$) to a total current already allocated (represented by $I_{ntotal}-I_n$) to each of the bypass converters having current above the threshold.

At operation 530, the converters may be controlled to the target current $I_f(i)$. Each of the bypass converters 206 may be provided a target current and may operate the switching devices within the bypass converter 206 to achieve the target current.

After the current cutoff and redistribution, the total current of all of the bypass converters 206 may remain unchanged. The total current allocated to the bypass converters 206 remains the same before and after the efficiency limits have been applied. The difference may be in the allocation of the currents to the bypass converters. Further, the bypass converters that are limited or restricted are operated at zero current.

The operating strategy disclosed improves overall efficiency of the system as the bypass converters are operated at higher levels of efficiency. In addition, the strategy provides opportunities for active balancing the battery cells during vehicle operation without unnecessary losses.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising;
a traction battery comprised of cells;
power converters, each electrically coupled between a corresponding group of cells and an electrical bus; and
a controller programmed to
allocate current demand to the power converters,
responsive to currents allocated to a subset of the power converters having magnitudes less than a threshold, redistribute a sum of the currents to power converters not in the subset and operate the subset to provide no current, and
increase current magnitude of each of the power converters not in the subset by a factor that is a ratio of the current demand to a total current already allocated to each of the power converters not in the subset.

2. The vehicle of claim 1 wherein the controller is further programmed to initially allocate current demand to the power converters based on states of charge of the groups of cells such that a first power converter coupled to a first group of cells having a state of charge greater than a state of charge of a second group of cells coupled to a second power converter receives a greater current allocation.

3. The vehicle of claim 1, wherein current allocated to one or more of the power converters is a negative current that flows to the cells.

4. The vehicle of claim 1 wherein the threshold is a current level corresponding to an efficiency being less than a predetermined converter efficiency.

5. The vehicle of claim 1 wherein the currents include positive currents flowing from the cells and negative currents flowing to the cells, and the controller is further programmed to redistribute a sum of the positive currents to power converters with positive current allocation and redistribute a sum of the negative currents to power converters with negative current allocation.

6. The vehicle of claim 1 wherein the controller is further programmed to, responsive to currents allocated to all of the power converters having magnitudes less than the threshold, redistribute the current demand to a group of the power converters such that current is supplied by a set of power converters and that each of the power converters provides current that exceeds the threshold.

7. The vehicle of claim 1 wherein the controller is further programmed to redistribute the current such that a total current provided by the power converters is same before and after redistribution of the currents.

8. A method comprising:
operating, by a controller, power converters electrically coupled between corresponding groups of battery cells and an electrical bus to satisfy a current demand of the electrical bus by allocating a portion of the current demand to each of the power converters,
responsive to a subset of the power converters being allocated currents having magnitudes less than a threshold, redistributing a sum of the currents to power converters not in the subset and operating the subset to provide no current, wherein the currents include positive currents and negative currents;
redistributing a sum of the positive currents to power converters with positive current allocation; and
redistributing a sum of the negative currents to power converters with negative current allocation.

9. The method of claim 8 further comprising allocating the current demand based on a state of charge of the corresponding groups of battery cells.

10. The method of claim 8 further comprising redistributing current by increasing current to each of the power converters not in the subset by a factor that is a ratio of the current demand to a total current already allocated to each of the power converters not in the subset.

11. The method of claim 8 further comprising, responsive to all of the power converters being allocated currents having magnitudes less than the threshold, redistributing the current demand to a group of power converters such that each provides current that exceeds the threshold.

12. The method of claim 8 further comprising redistributing the sum of the currents such that a total current provided by the power converters is the same before and after redistribution of the currents.

13. The method of claim 8 wherein the threshold is a current leve corresponding to an efficiency being less than a predetermined converter efficiency.

14. A vehicle electrical system comprising:
a plurality of power converters each electrically coupled between a group of battery cells and an electrical bus; and
a controller programmed to
allocate current demand to the power converters,
responsive to currents allocated to a subset of the power converters having magnitudes less than a threshold, redistribute a sum of the currents to power converters not in the subset such that a total current provided by the power converters is same before and after redistribution of the currents and operate the subset to provide no current, and
responsive to currents allocated to all of the power converters having magnitudes less than the threshold, redistribute the current demand to a group of the power converters such that current is supplied by a set of power converters that each provide current that exceeds the threshold.

15. The vehicle electrical system of claim 14 wherein the controller is further programmed to increase current magnitudes to each of the power converters not in the subset by a factor that is a ratio of the current demand to a total current already allocated to each of the power converters not in the subset.

16. The vehicle electrical system of claim 14 wherein the currents include positive currents and negative currents, and the controller is further programmed to redistribute a sum of the positive currents to power converters with positive current allocation and redistribute a sum of the negative currents to power converters with negative current allocation.

17. The vehicle electrical system of claim 14 wherein the threshold is a current level corresponding to an efficiency being less than a predetermined converter efficiency.

* * * * *